United States Patent
Kato et al.

(10) Patent No.: US 11,034,814 B2
(45) Date of Patent: Jun. 15, 2021

(54) CORE MATERIAL FOR FIBER REINFORCED COMPOSITE AND FIBER REINFORCED COMPOSITE HAVING THE SAME

(71) Applicant: ASAHI KASEI KABUSHIKI KAISHA, Tokyo (JP)

(72) Inventors: Yumiko Kato, Tokyo (JP); Shintaro Wakimura, Tokyo (JP); Yuichiro Sakamoto, Tokyo (JP); Tomoyuki Taniguchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 16/500,894

(22) PCT Filed: Apr. 2, 2018

(86) PCT No.: PCT/JP2018/014149
§ 371 (c)(1),
(2) Date: Oct. 4, 2019

(87) PCT Pub. No.: WO2018/186360
PCT Pub. Date: Oct. 11, 2018

(65) Prior Publication Data
US 2020/0140644 A1    May 7, 2020

(30) Foreign Application Priority Data

Apr. 7, 2017 (JP) .............................. JP2017-076867
May 12, 2017 (JP) .............................. JP2017-095875

(51) Int. Cl.
*C08J 9/18* (2006.01)
*C08J 9/06* (2006.01)

(52) U.S. Cl.
CPC . *C08J 9/18* (2013.01); *C08J 9/06* (2013.01); *C08J 2201/034* (2013.01); *C08J 2203/02* (2013.01); *C08J 2371/12* (2013.01)

(58) Field of Classification Search
CPC . C08J 9/18; C08J 9/06; C08J 2201/034; C08J 2203/02; C08J 2371/12; C08J 2203/06; C08J 9/0061; C08J 2425/06; C08J 9/232; C08J 9/12; C08J 9/288; C08J 2325/06; B23B 5/24; B23B 7/02; B32B 5/24; B32B 7/02

See application file for complete search history.

(56) References Cited

U.S. PATENT DOCUMENTS

| 6,067,473 A | 5/2000 | Greeninger et al. |
| 2010/0261000 A1 | 10/2010 | Jones |

FOREIGN PATENT DOCUMENTS

| EP | 2465893 A1 | 6/2012 |
| GB | 2455043 A | 6/2009 |
| JP | H05310986 A | 11/1993 |
| JP | 2005350055 A | 12/2005 |
| JP | 2009145694 A | 7/2009 |
| JP | 2012166386 A | 9/2012 |
| JP | 2012166387 A * | 9/2012 |
| JP | 2012166387 A | 9/2012 |
| JP | 2014208417 A * | 11/2014 |
| JP | 2014208417 A | 11/2014 |
| JP | 2015047757 A | 3/2015 |
| JP | 2015083365 A | 4/2015 |

OTHER PUBLICATIONS

Feb. 3, 2020, the Supplementary European Search Report issued by the European Patent Office in the corresponding European Patent Application No. 18781116.1.
Oct. 8, 2019, International Preliminary Report on Patentability issued in the International Patent Application No. PCT/JP2018/014149.
Jun. 12, 2018, International Search Report issued in the International Patent Application No. PCT/JP2018/014149.

* cited by examiner

*Primary Examiner* — Kara B Boyle
(74) *Attorney, Agent, or Firm* — Kenja IP Law PC

(57) ABSTRACT

To provide a core material for a fiber reinforced composite having an excellent workability upon being composited with a fiber reinforcing material. A core material for a fiber reinforced composite of the present disclosure comprises a molded product of expanded beads containing a thermoplastic resin, and having a heat shrinkage onset temperature of 80° C. or higher, a linear expansion coefficient of $10 \times 10^{-5}$ mm/mm·° C. or less, and a ratio of change in dimensions with heating at 130° C. of −4.0% to 0%.

6 Claims, No Drawings

CORE MATERIAL FOR FIBER REINFORCED COMPOSITE AND FIBER REINFORCED COMPOSITE HAVING THE SAME

TECHNICAL FIELD

The present disclosure relates to a core material for a fiber reinforced composite that is light-weight and has an excellent workability upon being composited with a fiber reinforced layer or the like.

BACKGROUND

Fiber reinforced synthetic resins that are reinforced with fibers are light-weight and have high mechanical strengths. Thus, applications of such fiber reinforced synthetic resins have recently been extended in industries requiring light weights and high mechanical strengths, such as automotive, marine vessels, aerospace, and medical industries.

As fiber reinforced synthetic resins meeting such demands, fiber reinforced composites have been proposed which have an expanded article as a core material, and a fiber reinforced resin laminated on a surface of the core material such that they are unified (see PTLs 1-3).

CITATION LIST

Patent Literature

PTL 1: JP6067473B
PTL 2: JP2015-47757A
PTL 3: JP2015-83365A

SUMMARY

Technical Problem

The methods of manufacturing fiber reinforced composites disclosed in PTLs 1 and 2, however, employ quite specialized techniques that require expanded articles to be expanded to form core materials. This makes thin wall molding difficult, and the magnitudes of expansions of an expanded article in sites having different thicknesses uncontrollable. Thus, there remain issues that need to be addressed, such as formable shapes are limited and the smoothness and the appearance reduce due to uneven expansion of an expanded article. PTL 3 discloses a composite of a fiber reinforced composite material and a polypropylene (PP) resin expanded article or a polymethacrylimide (PMI) resin expanded article. However, such a polypropylene (PP) resin expanded article has a low rigidity with heating, which restricts compositing conditions with fiber reinforcing materials. Although a polymethacrylimide (PMI) resin expanded article has an excellent heat resistance, the manufacturing method thereof is specific. Thus, there still remain issues, such as shapes of expanded articles are limited to plate-shapes, desired shapes cannot be formed, and the appearances of composites are bad.

Solution to Problem

We found that a core material made from a resin having certain high temperature characteristics exhibited an excellent workability upon being composited with a fiber reinforcing material, and thereby completed the present disclosure.

Specifically, this disclosure provides the following:

(1) A core material for a fiber reinforced composite comprising: a molded product of expanded beads containing a thermoplastic resin, and having a heat shrinkage onset temperature of 80° C. or higher, a linear expansion coefficient of $10 \times 10^{-5}$ mm/mm·° C. or less, and a ratio of change in dimensions with heating at 130° C. of −4.0% to 0%.

(2) The core material for a fiber reinforced composite of (1), wherein the thermoplastic resin has a ratio (G'2/G'1) of a storage modulus (G'1) at (Tp−30)° C. and a storage modulus (G'2) at 150° C. is 0.25 to 0.95, where Tp is a temperature where a loss tangent tan δ reaches a maximum value between 70° C. and 200° C.

(3) The core material for a fiber reinforced composite of (1) or (2), wherein a concentration of an aliphatic hydrocarbon gas in the molded product of expanded beads is 500 ppm by volume or less.

(4) The core material for a fiber reinforced composite of any one of (1) to (3), wherein the thermoplastic resin contains 30% by mass to 75% by mass of a polyphenylene ether resin.

(5) The core material for a fiber reinforced composite of any one of (1) to (4), wherein a content of a flame retardant in the thermoplastic resin is 3% by mass or less relative to 100% by mass of the thermoplastic resin.

(6) A fiber reinforced composite comprising:
the core material for a fiber reinforced composite of any one of (1) to (5); and
a skin material comprising fibers and a resin, the skin material being disposed on at least a part of a surface of the core material.

Advantageous Effect

The core material for a fiber reinforced composite of the present disclosure has an excellent workability upon being composited with a fiber reinforcing material.

DETAILED DESCRIPTION

In the following, an embodiment for embodying this disclosure (hereinafter referred to as "the present embodiment" as well) is exemplified. The following embodiments merely exemplify the present disclosure. The present disclosure is not limited to the following embodiments and may be implemented with various alterations that are within the essential scope thereof.

A core material of fiber reinforced composites of this embodiment comprises a molded product of expanded beads, and may be consisting of the molded product of expanded beads. The core material may include a component other than the molded product of expanded beads according to its purposes and/or applications.

—Molded Product of Expanded Beads—

The molded product of expanded beads contains a thermoplastic resin, and optionally contain a small amount of gas, an additive, or the like.

The content of the thermoplastic resin in molded product of expanded beads is preferably 50 to 100% by mass, and the molded product of expanded beads may be consisting of the thermoplastic resin.

—Thermoplastic Resin—

The thermoplastic resin preferably has, but not is limited to, a ratio (G'2/G'1) of a storage modulus (G'1) at (Tp−30)° C. and a storage modulus (G'2) at 150° C. is 0.25 to 0.95, where Tp is a temperature where a loss tangent tan δ reaches the maximum value between 70° C. and 200° C. When the value of G'2/G'1 is within this range, a suitable rigidity is more likely to be maintained at high temperatures, reducing deformation during composite processing, and an adhesive strength is more likely to be increased due to promoted mixing with a fiber reinforcing material. The value of G'2/G'1 is preferably 0.30 to 0.90, and more preferably 0.30 to 0.85.

The thermoplastic resin preferably contains a polyphenylene ether resin in respect of better adhesion with a fiber reinforcing material, and may contain a resin other than the polyphenylene ether resin (other resins).

—Polyphenylene Ether Resin—

The polyphenylene ether resin is a polymer including a repeating unit represented by the following general formula (1), and examples thereof include homopolymers composed of a repeating unit represented by the following general formula (1) and copolymers having a repeating unit represented by the following general formula (1), for example:

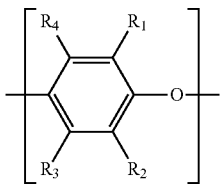

(1)

where $R_1$, $R_2$, $R_3$, and $R_4$ in the formula (1) are each, independently of one another, monovalent groups selected from the group consisting of a hydrogen atom; a halogen atom; an alkyl group; an alkoxy group; a phenyl group; a haloalkyl group or a haloalkoxy group having at least two carbon atoms between a halogen atom and the benzene ring in the general formula (1) and containing no third α-carbon.

Examples of the polyphenylene ether resin include, but are not limited to, poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dilauryl-1,4-phenylene)ether, poly(2,6-diphenyl-1,4-diphenylene)ether, poly(2,6-dimethoxy-1,4-phenylene)ether, poly(2,6-diethoxy-1,4-phenylene)ether, poly(2-methoxy-6-ethoxy-1,4-phenylene) ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene) ether, poly(2-ethoxy-1,4-phenylene)ether, poly(2-chloro-1,4-phenylene)ether, and poly(2,6-dibromo-1,4-phenylene) ether. Of these, preferred are polymers having a repeating unit wherein $R_1$ and $R_2$ are each an alkyl group having a carbon number of 1 to 4, and $R_3$ and $R_4$ are each a hydrogen atom or an alkyl group having a carbon number of 1 to 4 in the general formula (1).

One of the polyphenylene ether resins may be used alone or two or more of them may be used in combination.

The weight average molecular weight of the polyphenylene ether resin is preferably 20,000 to 60,000.

The content of the polyphenylene ether (PPE) resin in the present embodiment is preferably 30 to 75% by mass, more preferably 35 to 65% by mass, and even more preferably 35 to 50% by mass, relative to 100% by mass of the thermoplastic resin contained in the molded product of expanded beads. When the content of PPE is 30% by mass or more, an excellent heat resistance is more likely to be provided, and when the content of PPE is 75% by mass or less, excellent workability is more likely to be provided.

—Resins Other than Polyphenylene Ether Resin (Other Resin)—

Examples of an additional resin include thermoplastic resins, including polyolefin resins such as polyethylene, polypropylene, ethylene-vinyl acetate copolymer (EVA); polyvinyl alcohols; polyvinyl chloride; polyvinylidene chloride; acrylonitrile-butadiene-styrene (ABS) resins; acrylonitrile-styrene (AS) resins; polystyrene resins; methacrylic resins; polyamide resins; polycarbonate resins; polyimide resins; polyacetal resins; polyester resins; acrylic resins; cellulose resins; thermoplastic elastomers such as styrene, polyvinyl chloride, polyurethane, polyester, polyamide, 1,2-polybutadiene, and fluoride rubber thermoplastic elastomers; and thermoplastic engineering plastics such as polyamide, polyacetal, polyester, and fluoride thermoplastic engineering plastics, for example. In addition, a modified and/or crosslinked resin may be used as long as the object of the present disclosure is not impaired. Of these, polystyrene resins are preferable in respect of compatibility.

One of them may be used alone or two or more of them may be used in combination.

Examples of the polystyrene resins include homopolymers of styrene or a styrene derivative, and copolymers having styrene and/or a styrene derivative as main components.

Examples of the styrene derivative include, but are not limited to, o-methylstyrene, m-methylstyrene, p-methylstyrene, t-butylstyrene, α-methylstyrene, β-methylstyrene, diphenylethylene, chlorostyrene, and bromostyrene, for example.

Examples of homopolymers of styrene or a styrene derivative include polystyrene, poly(α-methyl styrene), polychlorostyrene, for example.

Examples of the copolymer having styrene and/or a styrene derivative as a main component include styrene-α-olefin copolymer; styrene-butadiene copolymer; styrene-acrylonitrile copolymer; styrene-maleic acid copolymer; styrene-maleic anhydride copolymer; styrene-maleimide copolymer; styrene-N-phenylmaleimide copolymer; styrene-N-alkylmaleimide copolymer; styrene-N-alkylation phenylmaleimide copolymer; styrene-acrylic acid copolymer; styrene-methacrylic acid copolymer; styrene-methyl acrylate copolymer; styrene-methyl methacrylate copolymer; styrene-n-alkyl acrylate copolymer; styrene-n-alkyl methacrylate copolymer; ethyl vinyl benzene-divinyl benzene copolymer; terpolymers such as ABS and butadiene-acrylonitrile-α-methylbenzene copolymer; and graft copolymers such as styrene graft polyethylene, styrene graft ethylene-vinyl acetate copolymer, (styrene-acrylic acid) graft polyethylene, and styrene graft polyamide, for example.

One of them may be used alone or two or more of them may be used in combination.

Furthermore, a rubber component such as butadiene may be added to the polystyrene resin as necessary.

The content of the rubber component is preferably 1.0 to 20% by mass and more preferably 3.0 to 18% by mass relative to 100% by mass of the polystyrene resin.

The content of the additional resin in the present embodiment is preferably 25 to 70% by mass and more preferably 35 to 65% by mass relative to 100% by mass of the thermoplastic resin contained in the molded product of expanded beads, in respect of the workability of the expanded article.

—Gas—

The gas is to be contained in the manufacturing process of the molded product of expanded beads (described later).

Examples of the gas include, but are not limited to, air, carbonic acid gas, gases used as blowing agents, and an aliphatic hydrocarbon gas.

Specific examples of the aliphatic hydrocarbon gas include butane and pentane.

In the present embodiment, the concentration (content) of the aliphatic hydrocarbon gas in the molded product of expanded beads is preferably 500 ppm by volume or less and more preferably 200 ppm by volume or less, based on the volume of the molded product of expanded beads. Further, in the present embodiment, the concentration (content) of the aliphatic hydrocarbon gas in the core material is preferably 500 ppm by volume or less and more preferably 200 ppm or less by volume or less, based on the volume of the core material.

The content of the aliphatic hydrocarbon gas can be measured by gas chromatography.

When the content of the aliphatic hydrocarbon gas is controlled to be 500 ppm by volume or less, an expansion of the molded product of expanded beads induced by heating during composite processing is more likely to be reduced. This is more likely to provide excellent surface smoothness, adhesion, and strength, and a favorable dimensional repeatability, as well as reducing post-expansions. Further, a composite processing into a product with a more complicated shape is facilitated.

—Additives—

Examples of additives include a flame retardant, a rubber component, an antioxidant, a heat stabilizer, a lubricant, a pigment, a dye, a light resistance improver, an antistatic agent, an impact modifiers, talc and other nucleating agents, glass beads, an inorganic filler, and an anti-blocking agent.

Examples of the flame retardant include organic flame retardants, including halogen compounds such as bromine compounds, non-halogen compounds such as phosphorus compounds and silicone compounds; and inorganic flame retardants including metal hydroxides represented by aluminum hydroxide and magnesium hydroxide, and antimony compounds represented by antimony trioxide and antimony pentoxide.

The content of the flame retardant is preferably 3% by mass or less and more preferably 1% by mass or less relative to 100% by mass of the thermoplastic resin. When the content of the flame retardant is within such a range, the heat resistance and the rigidity during composite processing are more likely to be maintained and a good adhesion is more likely to be obtained. Further, a resultant composite can be made closer to a desired dimension, and the dimensional repeatability is more likely to be improved.

The properties of the molded product of expanded beads will be described.

The heat shrinkage onset temperature of the molded product of expanded beads is 80° C. or higher. When the heat shrinkage onset temperature is lower than 80° C., a molded product of expanded beads included in a core material shrinks at an early stage while the core material is being heated during composite processing with a fiber reinforcing material. This results in creases and other defects, impairing the appearance, because the extent of the shrinkage of the fiber reinforcing material is not sufficient to follow the shrinkage of the molded product of expanded beads. The heat shrinkage onset temperature is more preferably 85° C. or higher.

The heat shrinkage onset temperature can be measured by the method described in Examples below.

The linear expansion coefficient of the molded product of expanded beads is $10 \times 10^{-5}$ mm/mm·° C. or less. When the linear expansion coefficient is greater than $10 \times 10^{-5}$ mm/mm·° C., a molded product of expanded beads included in a core material expands but the fiber reinforcing material does not expand and cannot follow the expansion of the molded product of expanded beads in the heating step during composite processing with the fiber reinforcing material. This results in resin insufficiencies, creases, and other defects, impairing the appearance and reducing the adhesion. The linear expansion coefficient is more preferably $5 \times 10^{-5}$ mm/mm·° C. or less.

The linear expansion coefficient can be measured by the method described in Examples below.

The ratio of change in dimensions with heating of the molded product of expanded beads at 130° C. is −4.0 to 0%. A negative value indicates a shrinkage, whereas a positive value indicates an expansion. When the ratio of change in dimensions with heating is smaller than −4.0%, in other words, the percentage of shrinkage is greater than 4.0%, a molded product of expanded beads included in a core material becomes denser, which reduces the advantage of being light-weight. Furthermore, the desired dimension may not be achieved and/or the dimensional repeatability may be reduced. If the molded product of expanded beads shrink further, the adhesion between the molded product of expanded beads and the fiber reinforcing material decreases, which impairs the adhesion and the appearance. The molded product of expanded beads eventually melts, which makes production of a composite product impossible. When the ratio of change in dimensions with heating is greater than 0%, in other words, the molded product of expanded beads expands, a thin wall molding becomes difficult. Further, control on the extend of expansion is difficult, which reduces the dimensional repeatability and makes composite processing into complicated shapes impossible. Further, since a surface of molded product of expanded beads becomes rough, the surface smoothness of the resultant composite decreases and the adhesion thereof reduces. The ratio of change in dimensions with heating at 130° C. is more preferably −3.5 to 0%, and more preferably −3.0 to 0%.

The ratio of change in dimensions with heating at 130° C. can be measured by the method described in Examples below.

The expansion ratio of the molded product of expanded beads is not particularly limited, but is preferably 1.5 cm³/g or more and more preferably 2 cm³/g or more, and is preferably 40 cm³/g or less and more preferably 25 cm³/g or less. When the expansion ratio within such a range, an excellent heat resistance and a high rigidity at higher temperatures are more likely to be maintained while taking advantages of being light-weight.

The expansion ratio can be measured by the method described in Examples below.

The molded product of expanded beads described above can be fabricated by a bead expansion method. A molded product of expanded beads is advantageous in that it has a high degree of freedom of design when used as members, such as structural parts, because it has an excellent shape-ability to be formed into a wide variety of shapes. Furthermore, it is also advantageous in that a processing step can be omitted by simultaneously carrying out molding of the molded product of expanded beads and composite processing with the fiber reinforcing material.

The expanded beads used in the present disclosure can be obtained by incorporating a blowing agent into a thermoplastic resin (impregnating the thermoplastic resin with the blowing agent) (impregnating step), and causing the resin component to expand (expanding step), but this is not limiting.

In the impregnating step, a method to incorporate the blowing agent into the base material resin is not particularly limited, and a generally-used method can be applied. Examples of the method to incorporate the blowing agent include carrying out incorporation in a water medium utilizing suspension systems such as water (suspension impregnating), using thermal decomposition-type blowing agents such as sodium bicarbonate (blowing agent decomposition method), setting a gas to an atmosphere under a critical pressure or higher to convert the gas into a liquid phase, and bringing the liquid phase into contact with a base material resin (liquid phase impregnation), and bringing a base material resin into contact with a gas in a vapor phase under a high-pressure atmosphere of less than a critical pressure (vapor phase impregnation). Of these, particularly, the method to cause vapor phase impregnation under a high-pressure atmosphere of less than a critical pressure is preferred. The method to cause vapor phase impregnation improves the solubility of a gas into a resin as compared with suspension impregnation carried out under a high temperature condition, and is likely to increase the content of the blowing agent. As a result, a high expansion ratio is likely to be achieved, and cell sizes in the base material resin are also likely to be uniform. Similarly, the blowing agent decomposition method is carried out under a high temperature condition, and not all of the added thermal decomposition-type blowing agent is converted into a gas, and thus an amount of a gas to be generated is likely to be relatively small. Therefore, the vapor phase impregnation is advantageous in that the content of the blowing agent is likely to be increased. The sizes of facilities, such as a pressure resistant apparatus and a cooling apparatus, are more likely to be made smaller than those of the liquid phase impregnation, and thereby costs of facilities are likely to be reduced.

Although the vapor phase impregnation conditions are not particularly limited, the atmosphere pressure is preferably 0.5 to 6.0 MPa. The atmosphere temperature is preferably 5 to 30° C., and more preferably 7 to 20° C. When the atmosphere pressure and the atmosphere temperature are in the above-mentioned ranges, dissolution of a gas into the base material resin is likely to be promoted. Particularly, when the atmosphere temperature is low, the impregnation amount increases but an impregnating speed tends to be slow. When the atmosphere temperature is high, the impregnation amount decreases but the impregnating speed tends to be fast. In view of balancing these, it is preferable to set atmosphere temperature to the above-mentioned range so as to efficiently promote the dissolution of the gas into the base material resin.

The blowing agent is not particularly limited, and generally-used gases can be used. Examples thereof include inorganic gases such as air, carbonic acid gas, nitrogen gas, oxygen gas, ammonia gas, hydrogen gas, argon gas, helium gas, and neon gas; fluorocarbons such as trichlorofluoromethane (R11), dichlorodifluoromethane (R12), chlorodifluoromethane (R22), tetrachlorodifluoroethane (R112), dichlorofluoroethane (R141b), chlorodifluoroethane (R142b), difluoroethane (R152a), HFC-245fa, HFC-236ea, HFC-245ca, and HFC-225ca; saturated hydrocarbons such as propane, n-butane, i-butane, n-pentane, i-pentane, and neopentane; ethers such as dimethyl ether, diethyl ether, methyl ethyl ether, isopropyl ether, n-butyl ether, diisopropyl ether, furan, furfural, 2-methylfuran, tetrahydropyran, and tetrahydropyran; ketones such as dimethyl ketone, methyl ethyl ketone, diethyl ketone, methyl n-propyl ketone, methyl n-butyl ketone, methyl i-butyl ketone, methyl n-amyl ketone, methyl n-hexyl ketone, ethyl n-propyl ketone, and ethyl n-butyl ketone; alcohols such as methanol, ethanol, propyl alcohol, i-propyl alcohol, butyl alcohol, i-butyl alcohol, and t-butyl alcohol; carboxylate esters such as methyl formate ester, ethyl formate ester, propyl formate ester, butyl formate ester, amyl formate ester, methyl propionate ester, and ethyl propionate ester; and chlorinated hydrocarbons such as methyl chloride and ethyl chloride.

One of them may be used alone or two or more of them may be used in combination.

An inorganic gas is preferred in respect of safety of the gas. Because the inorganic gases are less soluble into a resin as compared with organic gases, such as hydrocarbons, and are more likely to be escaped from the resin after an expanding step or a molding step, the dimensional stability of a molded product over time is advantageously higher. Furthermore, plasticization of the resin by a residual gas is less likely to occur, and excellent heat resistance is likely to advantageously exhibit from the earlier stage after molding. Of the inorganic gases, carbonic acid gas is preferred in respect of solubility into a resin and ease of handling, and the impregnation amount thereof is preferably 0.5 to 10% by mass based on the resin. The amount is more preferably 1.0 to 9% by mass.

When the amount of carbonic acid gas to be impregnated is 0.5% by mass or more, a higher expansion ratio is likely to be achieved and the cell sizes in the base material resin are less likely be varied, which tends to reduce variations of the expansion ratios of the base material resins. When the amount of carbonic acid gas is 10% by mass or less, appropriate cell sizes are achieved, which tends to help to maintain the closed cell ratio.

Although a method for expanding the expanded beads in the expanding step is not particularly limited, examples thereof include a method for exposing a base material resin under a high-pressure condition to a low-pressure atmosphere at once to make a gas dissolved in the base material resin to expand, and a method for heating a base material resin by pressurized water vapor or the like to make a gas dissolved in the base material resin to expand. Of these, the method for heating the base material resin to cause expansion is particularly preferable. This is because the method is likely to make the cell sizes in the base material resin uniform as compared with the method for exposing the base material resin under a high-pressure condition to a low-pressure atmosphere at once. The method is also advantageous in that the expansion ratio, particularly the expansion ratio of products having low expansion ratios, is more easily controlled.

In the expanding step, the pressure for introducing vapor to an expanding machine is preferably 6.0 to 15.0 kg/cm$^2$·G, and more preferably 6.1 to 12.0 kg/cm$^2$·G. When the introduction pressure is low, the capacity of the vapor to heat the pre-expanding machine is reduced, which lengthens the time required to raise the temperature to a suitable temperature upon a prefoam. This increases the probability of the phenomenon called "blocking" in which surfaces of pre-expanded beads melt and the adjacent pre-expanded beads stick to each other to form aggregates. When the pressure to introduce the vapor is 6.0 kg/cm$^2$·G or higher, the vapor pressure inside the pre-expanding machine increases rapidly and favorable pre-expanded beads without being blocked are more likely to be obtained. A more uniform and more efficient expansion can be achieved, for example, by introducing water vapor from numerous water vapor vents from a lower part of an expanding vessel, and stirring the resin with a stirring blade. The number of rotations of the stirring blade is preferably 20 to 120 rpm, and more preferably 50 to 90 rpm. When the number of rotations is 20 rpm or less, the pressurized water vapor does not hit the beads uniformly to tend to make control on expanding difficult or to cause defects, such as blocking. When the number of rotations is 120 rpm or more, the beads during expanding are damaged by the stirring blade, and thereby the closed cell ratio tends to be reduced, or a desired expansion ratio tends not to be obtained.

When the expanded beads are expanded to a desired expansion ratio, the expanded beads may be expanded in one stage in the expanding step, or may be expanded in multiple stages, such as secondary expanding and tertiary expanding. A multistage expansion is advantageous in that it facilitates preparation of pre-expanded beads with high expansion ratios.

When multiple stage forming is carried out, pre-expanded beads are preferably pressurized by a gas prior to expansion in each stage. The gas used for the pressurizing is not particularly limited as long as it is inert to the resin, but inorganic gases and hydrofluoroolefins that are safe and have low global warming potentials are preferred. Examples of the inorganic gases include air, carbonic acid gas, nitrogen gas, oxygen gas, ammonia gas, hydrogen gas, argon gas, helium gas, and neon gas. Examples of the hydrofluoroolefins include HFO-1234y, HFO-1234ze (E) and the like. Air and carbonic acid gas are particularly preferred in respect of ease of handling and costs. Examples of the method for the pressurizing include, but are not limited to, a method for filling a pressurized tank with pre-expanded beads and supplying a gas to the tank.

The shape of expanded beads formed in the foaming step is not particularly limited, and examples thereof include a pillar, a rectangular parallelepiped, a sphere, indeterminate crushed products, for example.

The sizes (particle diameters) of expanded beads are preferably 0.2 to 3 mm. When the sizes are in this range, the particles after pre-expansion have moderate sizes, are more easily handled, and are likely to be more densely filled upon molding. The sizes of the expanded beads can be measured with a caliper.

Although an expansion ratio of the expanded beads obtained in the expanding step is not particularly limited, the expansion ratio is preferably 1.5 to 40 $cm^3/g$, and more preferably 2 to 25 $cm^3/g$. When the expansion ratio is within this range, molded product of expanded beads having excellent heat resistance and an excellent rigidity at higher temperatures can be obtained, as well as taking advantages of being light-weight. A primary expansion ratio is preferably $1.4 \times 10$ $cm^3/g$ when the expansion ratio is to be adjusted to a desired value in multiple stages. When the primary expansion ratio is in this range, a cell size in the molded product of expanded beads is more likely to be uniform, and a secondary expanding activity can be imparted more readily.

An expansion ratio of an expanded bead is defined as a ratio (Vp/Wp) of the volume Vp of the expanded bead and the weight Wp of the expanded bead. Further, as used herein, a volume of an expanded bead is defined as a volume measured with a submergence method.

A molded product of expanded beads can be formed from expanded beads using a generally-used molding method (molding step).

Examples of the molding method include, but are not limited to, a method for filling a molding die with expanded beads in a molding step, fusing the beads simultaneously with heat of the expanded beads to expand the expanded beads, and thereafter cooling and solidifying the beads for molding. Examples of a method for filling the expanded beads include, but are not limited to, a cracking method for filling a metal mold with expanded beads while the metal mold is opened to some extent during filling, a compressing method for compressing expanded beads while a metal mold is kept closed for filling of the pressurized beads, and a compression cracking method for performing cracking after compressed beads are filled.

It is preferable to carry out a pressurizing step of pressurizing expanded beads under an inorganic gas atmosphere before the expanded beads are filled. This is because air bubbles in the expanded beads are imparted with a certain gas pressure by carrying out the pressurizing treatment, and which makes the expanded beads to be more uniformly expanded and molded. Although a pressure source for carrying out the pressurizing treatment is not particularly limited, it is preferable to use an inorganic gas in respect of the flame retardancy, heat resistance, and the dimensional stability described above. Examples of the inorganic gas include air, carbonic acid gas, nitrogen gas, oxygen gas, ammonia gas, hydrogen gas, argon gas, helium gas, and neon gas. Air and carbonic acid gas are preferable in respect of ease of handling and costs, but the inorganic gas is not limited to these. Although the method for the pressurizing treatment is not particularly limited, examples thereof include a method for filling a pressurized tank with expanded beads and supplying an inorganic gas into the tank to pressurize the expanded beads.

When the expanded beads set forth above are used, a molded body having a fine shape or a complicated shape can be produced by a well-known inmold forming method, and their possible applications are expanded.

For example, the expanded beads are molded by a decompression molding method (for example, JPS46-38359B), which uses a pair of molding dies for inmold forming conventional expanded beads, fills a molding die cavity with the expanded beads under a pressurized atmosphere pressure or a reduced pressure, closes the dies, compresses the molding die cavity so that a volume of the molding die cavity is decreased by 0 to 70%, and thereafter supplies a heat medium, such as water vapor, into the dies to heat the expanded beads, thereby heat fusing the expanded beads; and a pressure molding method (for example, JPS51-22951B) or the like which subjects expanded beads to a pressurizing treatment using a pressure gas in advance to increase pressures inside the expanded beads to enhance a secondary expanding property of the expanded beads, fills a molding die cavity with the expanded beads under an atmosphere pressure or a reduced pressure while maintaining the secondary expanding property, closes dies, and thereafter supplies a heat medium, such as water vapor, into the dies to heat the expanded beads, thereby heat fusing the expanded beads.

Molding can be achieved by a compression filling casting method for filling a cavity pressurized to an atmosphere pressure or greater by a compressed gas with expanded beads pressurized to the pressure or greater, and thereafter supplying a heat medium, such as water vapor, into the cavity to heat the expanded beads, thereby heat fusing the expanded beads (JPH4-46217B). In addition, molding can be also achieved by a pressureless filling molding method (JPH6-49795B) which fills a cavity of a pair of molding dies with expanded beads obtained under a special condition and having a high secondary expanding capability under an atmosphere pressure or a reduced pressure, and thereafter supplies heat media such as water vapor to heat the expanded beads, thereby heat fusing the expanded beads, or a method obtained by combining the above-mentioned methods (JPH6-22919B).

Although an expansion ratio of the molded body using the expanded beads of the present disclosure (molded product of expanded beads) is not particularly limited, the expansion ratio is preferably 1.5 to 40 cm$^3$/g, and more preferably 2 to 25 cm$^3$/g. When the expansion ratio is within this range, molded product of expanded beads having excellent heat resistance and an excellent rigidity at higher temperatures can be obtained while the advantage of being light-weight is exploited.

An expansion ratio of molded product of expanded beads is defined as a ratio (Vb/Wb) of the volume Vb of the molded product of expanded beads and the weight Wb of the molded product of expanded beads. Further, as used herein, a volume of molded product of expanded beads is defined as a volume measured with a submergence method.

(Fiber Reinforced Composite)

The core material of this embodiment can be used to be composited with a fiber reinforcing material (e.g., a skin material) to yield a fiber reinforced composite. A fiber reinforced composite is a composite comprising a core material including molded product of expanded beads, and a skin material comprising fibers and a resin, the skin material being disposed on at least a part of a surface of the core material. The core material may be a core material consisting of the molded product of expanded beads.

In the fiber reinforced composite of this embodiment, the location of the surface to dispose a skin material may be determined according to the shape of the core material. For example, when a core material has a sheet shape, a skin material may be disposed on the whole or a part of one or two surfaces of the core material. When the core material has a block shape, a skin material may be disposed on the whole or a part of the surfaces that are visible from a certain direction when the core material is stationarily placed. When the core material has a wire shape, a skin material may be disposed on the whole or a part of the surface along a certain direction extending in a given length from one end.

—Skin Material—

The skin material in the fiber reinforced composite of the present embodiment includes fibers and a resin, and optionally includes other components, such as an additive.

—Fibers—

The fibers may be highly strong and highly elastic fibers, and specific examples thereof includes carbon fibers, glass fibers, organic fibers (e.g., polyaramid fibers represented by Kevlar® manufactured by DuPont de Nemours, Inc., USA, Kevlar is a registered trademark in Japan, other countries, or both), alumina fibers, silicon carbide fibers, boron fibers, and silicon carbide fibers.

Of these, fibers having high specific modulus that is defined as the ratio of the elastic modulus to the density, specifically carbon fibers and glass fibers are preferable, and more preferable are carbon fibers.

One of these fibers may be used alone or two or more of them may be used in combination.

The tensile modulus of elasticity of the fibers in this embodiment measured in accordance with JIS K7127 is preferably 200 to 850 GPa in respect of providing a high rigidity.

The content of the fibers in this embodiment is preferably 40 to 80% by mass relative to 100% by mass of the skin material.

The weight per unit area of fibers on a surface of the skin material in this embodiment is preferably 50 to 4000 g/m$^2$, more preferably 100 to 1000 g/m$^2$, and may be 200 g/m$^2$, for example, in respect of increasing the rigidity and reducing the weight.

—Resin—

Examples of the resin include thermosetting resins and thermoplastic resins, and specific examples include an epoxy resin, a phenol resin, a cyanate resin, a benzoxazine resin, a polyimide resin, an unsaturated polyester resin, a vinyl ester resin, an ABS resin, a polyethylene terephthalate resin, a nylon resin, and a maleimide resin.

Of these, a thermosetting resin that is cured upon application of external energy such as heat, light, and electron beam is preferable, and specifically preferable is an epoxy resin.

One of these resins may be used alone or two or more of them may be used in combination.

The glass transition temperature of the resin is preferably 80 to 250° C., and more preferably 80 to 180° C. in respect of adhesion with a core material and prevention of deformation and/or bending.

The glass transition temperature can be measured by the midpoint method according to ASTM D3418.

When the resin is a thermosetting resin, the curing temperature of the resin is preferably 80 to 250° C., and more preferably 80 to 150° C., in respect of adhesion with a core material and prevention of deformation and/or bending.

The content of the resin in this embodiment is preferably 20 to 60% by mass, and more preferably 30 to 50% by mass, relative to 100% by mass of the skin material, in respect of adhesion with a core material and prevention of deformation and/or bending.

(Method of Manufacturing Fiber Reinforced Composite)

Hereinafter, a method of manufacturing fiber reinforced composite of the present embodiment will be described.

An exemplary method of manufacturing a fiber reinforced composite in this embodiment is a method of fabricating a fiber reinforced composite by disposing a core material including molded product of expanded beads and a skin material including a fiber and a resin in a molding machine, for molding. The shape of the core material is not particularly limited and may be suitably selected according to its purposes and/or applications, and examples thereof include a molded product, particles, a sheet, a wire (thread), and a block, for example.

((Skin Material Preparation Step))

In the skin material preparation step, a skin material is prepared by impregnating fibers with a resin, such as by immersing the fibers into the molten resin or spraying the molten resin onto the fibers. The skin material may also be prepared as a cloth prepreg.

After the fibers are impregnated with the resin, curing of the resin may be accelerated by application of light or heat.

When the fiber reinforced composite also has a sheet shape, the skin material may be made as described above for the fiber reinforced composite of this embodiment.

((Molding Step))

In the molding step, a core material (e.g., molded product of expanded beads) and a skin material may be placed in a molding machine in a desired configuration such that they are molded simultaneously.

The molded product of expanded beads may be further expanded in the molding step.

In this molding step, for manufacturing a sheet-like composite having two surfaces covered with skin materials, a molding machine may be filled with a sheet-like molded product of expanded beads and two sheet-like skin materials such that the molded product of expanded beads is sandwiched between the sheet-like skin materials. For manufacturing a block-like composite covered with a skin material, a molding machine may be filled with block-like molded product of expanded beads and a sheet-like skin material such that the molded product of expanded beads is wrapped with the sheet-like skin material. For manufacturing a wire-like composite covered with a skin material, a molding machine may be filled with wire-like molded product of expanded beads and a sheet-like skin material such that the molded product of expanded beads is wrapped with the sheet-like skin material.

In the molding step, the molded product of expanded beads and the skin material are kept at a temperature of 80 to 150° C., preferably 100 to 120° C. for 0 to 5 minutes, preferably 1 to 3 minutes, without applying a pressure, and then kept under a pressure of 0 to 3 MPa, preferably 0.1 to 1 MPa at a temperature of 80 to 150° C., preferably 100 to 120° C. for 5 to 30 minutes, preferably 10 to 20 minutes.

By keeping the molded product of expanded beads and the skin material under a high-temperature condition without applying a pressure before pressurizing, a heat can be uniformly applied to the skin material to thereby achieve a good surface smoothness.

The properties of the fiber reinforced composite of the present embodiment will be described.

The apparent density of the fiber reinforced composite of this embodiment is preferably 0.05 to 1 g/cm$^3$.

Note that the apparent density of a fiber reinforced composite refers to a ratio (W/V) of the weight of the fiber reinforced composite and the volume V of the fiber reinforced composite.

The dimension of the fiber reinforced composite of this embodiment may be determined according to its purposes and/or applications.

The thickness of the skin material may generally be 0.1 to 2 mm.

EXAMPLES

Hereinafter the present disclosure will be described hereinafter based on Examples and Comparative Examples, but the present disclosure is not limited to the following examples.

Evaluation methods of core materials (molded product of expanded beads) for fiber reinforced composites and the fiber reinforced composites were as follows.

(1) Heat Shrinkage Onset Temperature

A plate-like molded product of expanded beads of 300 mm×100 mm×10 mm (in thickness) was allowed to stand for 24 hours in an environment adjusted at 23° C. Three straight lines of 200 mm in length spaced apart with an interval of 20 mm and parallel to each other were drawn on the molded product of expanded beads, and the lengths (mm) of the lines were measured with a caliper. The lengths (mm) of the lines were measured again after the molded product of expanded beads was placed in an oven at 30° C. for 2 hours and then allowed to stand for 1 hour at 23° C. The oven temperature then was increased with an increment of 5° C., and the measurements were repeated. The temperature at which the lengths of all of the three lines reduced from the lengths at 23° C. was determined as a heat shrinkage onset temperature (° C.).

(2) Linear Expansion Coefficient

A plate-like molded product of expanded beads of 300 mm×100 mm×10 mm (in thickness) was allowed to stand for 24 hours in an environment adjusted at 23° C. Three straight lines of 200 mm in length spaced apart with an interval of 20 mm and parallel to each other were drawn on the molded product of expanded beads, and the lengths (mm) of the lines were measured with a caliper (Dimension A). The lengths (mm) of the lines were measured (Dimension B) immediately after the molded product of expanded beads was kept in an environment adjusted at 40° C. for 2 hours. The lengths (mm) of the lines were measured (Dimension C) immediately after the same molded product of expanded beads was kept in an environment adjusted at 5° C. for 2 hours. The linear expansion coefficient of each line was calculated using the following formula, and the averaged linear expansion coefficient was determined as the linear expansion coefficient (mm/mm·° C.) of the molded product of expanded beads.

Linear expansion coefficient=(Dimension $B$−Dimension $C$)/(Dimension $A$×35)

(3) Rate of Thermal Dimensional Change at 130° C.

Measurements were carried out according to the high-temperature dimensional stability test B method of JIS K6767 except that the heating temperature was 130° C. and the heating time was 1.5 minutes. The heating time of 1.5 minutes was initiated to be counted at the time when the temperature of a hot air circulatory drier reached at 130° C. after a test piece was placed in the drier.

(4) Viscoelasticity Measurement

A viscoelasticity measurement of a resin before expansion was carried out using a rheometer ARES-G2 manufactured by TA Instruments under the following conditions. The measurement was carried out while the temperature was being decreased from 300° C. When the test was discontinued due to solidification of the resin, data collected down to the solidification temperature was used. From the collected data, the storage modus G'1 at (Tp−30)° C. and the storage modulus G'2 at 150° C. were determined, where Tp was a temperature where a loss tangent tan δ was reached its maximum value between 70° C. (or the temperature where the test was discontinued) to 200° C., and G'2/G'1 was then calculated. When data at (Tp−30)° C. were not available due to solidification of the resin, the storage modulus at the temperature at which the test was discontinued was used as G'1.

Measurement jig: cone and plate
Measurement mode: melt
Scanning category: temperature scan
Strain magnification: 10%
Frequency: 10 rad/sec.
Temperature range: 70-300° C.
Temperature decline rate: 2° C./min.
Plate diameter: 25 mm
Gap interval: 1 mm
Automatic Mode: Axial force—10 g
Sensitivity—2.0 g

(5) Residual Gas Concentration

A head space bottle was charged with an amount of a sample of each molded product of expanded beads prepared in Examples and Comparative Examples, which was heated at a temperature equal to or higher than the softening point of the sample of the molded product of expanded beads for about 1 hour. Then, a gas in the head space bottle was quantified with gas chromatography (GC-14B manufactured by Shimadzu Corporation). Helium (He) was used as a career gas, and was controlled in a constant flow mode (about 30 ml/min). The temperature of a column (Porapak Q, 80/100 mesh, 3.2 mm in diameter×2.1 m) was increased to and maintained at 50 to 150° C., and detection was performed by a thermal conduction type detector (TCD). A volume of an aliphatic hydrocarbon gas was calculated from the detected area dimension and an analytical curve produced by a standard gas sample. A concentration (ppm by volume) of the aliphatic hydrocarbon gas was then calculated by dividing the volume of the aliphatic hydrocarbon gas by a volume of the sample of the molded product of expanded beads.

(6) Expansion Ratio of Molded Product of Expanded Beads

After the weight W (g) of a bead expanded body was measured, the volume V (cc) thereof was measured by a submergence method. A value V/W (cc/g) obtained by dividing the volume by the weight was defined as an expansion ratio ($cm^3/g$).

(7) Thickness

The thickness (mm) of the fiber reinforced composite and the thickness (mm) of the skin material of each of Example and Comparative Example were measured with a caliper.

(8) Apparent Density

The weight W (g) of each fiber reinforced composite of Examples and Comparative Examples was measured, and then the three sides of the sheet-like fiber reinforced composite were measured with a caliper to calculate the volume V ($cm^3$). The ratio (W/V) ($g/cm^3$) of the weight W and the volume V was determined as the apparent density.

(9) Surface Smoothness and Appearance

Each molded product of expanded beads of Examples and Comparative Examples was composited with skin materials, and the surface of the fiber reinforced composite was visually observed and scored as follows:

A (excellent): No crease or bubble was observed, and the surface smoothness was good.

B (good): Some creases and/or bubbles were observed, but the composite was acceptable for practical use.

C (poor): A number of resin insufficiencies and/or creases were observed, and the composite was not acceptable for practical use.

(10) Adhesion

Each molded product of expanded beads of Examples and Comparative Examples was composited with skin materials. The resultant fiber reinforced composite was cut at the center and at 10 mm from the edge, and the cross-sections were visually observed to score the adhesion between the skin materials and the core material as follows:

A (excellent): There was no gap between the skin materials and the core material, and the adhesion was good.

B (good): There were some gaps between the skin materials and the core material, but the adhesion was acceptable for practical use.

C (poor): There were a number of gaps and separations between the skin materials and the core material, and the adhesion was not acceptable for practical use.

(11) Dimensional Repeatability

For each of Examples and Comparative Examples, molded products of expanded beads were composited with skin materials. The longitudinal and transverse lengths of each of 30 of the resultant fiber reinforced composites were measured using a caliper. Then, the standard deviation (3σ) and the average of the measured dimensions were calculated, and the deviations (%)=(3σ/average)×100 were determined.

A (excellent): The deviation was less than 0.3%

B (good): The deviation was 0.3 to 0.5%

C (poor): The deviation was more than 0.5%

Example 1

As skin materials, two cloth prepregs were provided. Each of the cloth prepregs was made from carbon fibers with a tensile modulus of elasticity of 250 GPa and an epoxy resin having a curing temperature of 80° C., and had a weight per unit area of the fibers of 200 $g/m^2$ and a content of the carbon fibers of 60% by mass.

In addition, 22% by mass of a non-halogen flame retardant was added to 100% by mass of a thermoplastic resin containing 73% by mass of a polyphenylene ether resin (PPE), 12% by mass of an impact-resistant polystyrene resin (HIPS) having 6% by mass of a rubber concentration so that a rubber component was set to 0.6% by mass, and 15% by mass of a general-purpose polystyrene resin (PS). The mixture was heat melted and kneaded, and then extruded by an extruder to produce base material resin pellets as a core material. A viscoelasticity measurement of this base material resin revealed that Tp was 153° C. and G'2/G'1 was 0.40.

After a pressure-resistant vessel was charged with the base material resin pellets according to the method described in Example 1 of JPH4-372630A, and a gas in the container was replaced with dry air. Then carbon dioxide (gas) was injected as a blowing agent, and the base material resin pellets were impregnated with 7% by mass of carbon dioxide for 3 hours under conditions of a pressure of 3.2 MPa and a temperature of 11° C.

The base material resin pellets were expanded in a pre-expanding machine with pressurized water vapor while the stirring blade was rotated at 77 rpm to yield expanded beads.

To carry out a pressurizing treatment, the pressure of the expanded beads was increased to 0.5 MPa over 1 hour, and then kept at 0.5 MPa for 8 hours.

After an inmold forming metal mold having water vapor vents was filled with the expanded beads, the expanded beads were heated with pressurized water vapor to cause the expanded beads to be expanded and fused together. The expanded beads were then cooled, and removed from the forming metal mold, to yield a molded product of expanded beads (expanded article) of 300 mm×300 mm×10 mm (in thickness) and having an expansion ratio of 10 $cm^3/g$.

The heat shrinkage onset temperature of the resultant molded product of expanded beads was measured to be 85° C. The linear expansion coefficient of the resultant molded product of expanded beads was measured to be $5\times10^{-5}$ mm/mm·° C. The ratio of change in dimensions of the resultant molded product of expanded beads at 130° C. was −3.6%. The concentration of the aliphatic hydrocarbon gas in the resultant molded product of expanded beads was measured to be the detection limit (50 ppm by volume) or lower.

Respective skin materials prepared as described above were laminated on the top and bottom surfaces of the resultant molded product of expanded beads as a core material. The laminate was then kept at 100° C. for 3 minutes without being pressurized, and kept for 15 minutes while being pressurized at a surface pressure of 0.4 MPa, to thereby simultaneously mold the skin materials and the core material to yield a fiber reinforced composite.

The detailed conditions are listed in Table 1.

The fiber reinforced composite of Example 1 had an excellent appearance without any creases or bubbles. As for adhesion, there were some gaps between the skin materials and the core material, but the adhesion was acceptable for practical use. As for the dimensional repeatability, there was some variation in the dimension, but it was acceptable for practical use.

Example 2

Base material resin pellets as a core material were fabricated by heat melting, kneading, and then extruding 40% by mass of a polyphenylene ether resin (PPE) and 60% by mass of a polystyrene resin (PS) in the extruder. A viscoelasticity measurement of this base material resin revealed that Tp was 158° C. and G'2/G'1 was 0.81.

A molded product of expanded beads was fabricated using the pellets in the manner similar to Example 1.

The heat shrinkage onset temperature of the resultant molded product of expanded beads was measured to be 95° C. The linear expansion coefficient of the resultant molded product of expanded beads was measured to be $4 \times 10^{-5}$ mm/mm·° C. The ratio of change in dimensions of the resultant molded product of expanded beads at 130° C. was a shrinkage of 0.1% or smaller. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Example 2 was excellent in appearance, adhesion, and dimensional repeatability.

Example 3

A molded product of expanded beads with an expansion ratio of 5 cm³/g was fabricated using the thermoplastic resin in Example 2.

The heat shrinkage onset temperature of the resultant molded product of expanded beads was measured to be 95° C. The linear expansion coefficient of the resultant molded product of expanded beads was measured to be $4 \times 10^{-5}$ mm/mm·° C. The ratio of change in dimensions of the resultant molded product of expanded beads at 130° C. was a shrinkage of 0.1% or smaller. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Example 3 was excellent in appearance, adhesion, and dimensional repeatability similarly to the fiber reinforced composite of Example 2.

Example 4

A molded product of expanded beads with an expansion ratio of 15 cm³/g was fabricated using the thermoplastic resin in Example 2.

The heat shrinkage onset temperature of the resultant molded product of expanded beads was measured to be 95° C. The linear expansion coefficient of the resultant molded product of expanded beads was measured to be $4 \times 10^{-5}$ mm/mm·° C. The ratio of change in dimensions of the resultant molded product of expanded beads at 130° C. was a shrinkage of 0.1% or smaller. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Example 4 was excellent in appearance, adhesion, and dimensional repeatability similarly to the fiber reinforced composite of Example 2.

Example 5

Base material resin pellets as a core material were fabricated by heat melting, kneading, and then extruding 50% by mass of a polyphenylene ether resin (PPE) and 50% by mass of a polystyrene resin (PS) in the extruder. A viscoelasticity measurement of this base material resin revealed that Tp was 165° C. and G'2/G'1 was 0.87.

A molded product of expanded beads was fabricated using the pellets in the manner similar to Example 1. The heat shrinkage onset temperature of the resultant molded product of expanded beads was measured to be 105° C. The linear expansion coefficient of the resultant molded product of expanded beads was measured to be $3 \times 10^{-5}$ mm/mm·° C. The ratio of change in dimensions of the resultant molded product of expanded beads at 130° C. was a shrinkage of 0.1% or smaller. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Example 5 was excellent in appearance, adhesion, and dimensional repeatability similarly to the fiber reinforced composite of Example 2.

Example 6

Base material resin pellets as a core material were fabricated by heat melting, kneading, and then extruding 60% by mass of a polyphenylene ether resin (PPE) and 40% by mass of a polystyrene resin (PS) in the extruder. A viscoelasticity measurement of this base material resin revealed that Tp was 173° C. and G'2/G'1 was 0.93.

A molded product of expanded beads was fabricated using the pellets in the manner similar to Example 1. The heat shrinkage onset temperature of the resultant molded product of expanded beads was measured to be 115° C. The linear expansion coefficient of the resultant molded product of expanded beads was measured to be $2 \times 10^{-5}$ mm/mm·° C. The ratio of change in dimensions of the resultant molded product of expanded beads at 130° C. was a shrinkage of 0.1% or smaller. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Example 6 was excellent in appearance, adhesion, and dimensional repeatability similarly to the fiber reinforced composite of Example 2.

Example 7

Base material resin pellets as a core material were fabricated by heat melting, kneading, and then extruding 35% by mass of a polyphenylene ether resin (PPE) and 65% by mass of a polystyrene resin (PS) in the extruder. A viscoelasticity measurement of this base material resin revealed that Tp was 154° C. and G'2/G'1 was 0.45.

A molded product of expanded beads was fabricated using the pellets in the manner similar to Example 1. The heat shrinkage onset temperature of the resultant molded product of expanded beads was measured to be 85° C. The linear expansion coefficient of the resultant molded product of expanded beads was measured to be $5 \times 10^{-5}$ mm/mm·° C. The ratio of change in dimensions of the resultant molded product of expanded beads at 130° C. was a shrinkage of 0.1% or smaller. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Example 7 was excellent in appearance, adhesion, and dimensional repeatability similarly to the fiber reinforced composite of Example 2.

Example 8

Base material resin pellets as a core material were fabricated by heat melting, kneading, and then extruding 30% by mass of a polyphenylene ether resin (PPE) and 70% by mass of a polystyrene resin (PS) in the extruder. A viscoelasticity measurement of this base material resin revealed that Tp was 150° C. and G'2/G'1 was 0.28.

A molded product of expanded beads was fabricated using the pellets in the manner similar to Example 1. The heat shrinkage onset temperature of the resultant molded product of expanded beads was measured to be 80° C. The linear expansion coefficient of the resultant molded product of expanded beads was measured to be $5 \times 10^{-5}$ mm/mm·° C. The ratio of change in dimensions of the resultant molded product of expanded beads at 130° C. was −0.3%. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The appearance of the fiber reinforced composite of Example 8 had slight creases, which was acceptable for practical use. Further, the composite was slightly thinner and the apparent density was higher than that of Example 1.

Comparative Example 1

Base material resin pellets as a core material were fabricated by heat melting, kneading, and then extruding 100% by mass of a polystyrene resin (PS) in the extruder. A viscoelasticity measurement of this base material resin revealed that Tp was 118° C. and G'2/G'1 was 0.01 or less.

Molded product of expanded beads was fabricated using the pellets in the manner similar to Example 1. The heat shrinkage onset temperature of the resultant molded product of expanded beads was measured to be 70° C. The linear expansion coefficient of the resultant molded product of expanded beads was measured to be $7 \times 10^{-5}$ mm/mm·° C. The ratio of change in dimensions of the resultant molded product of expanded beads at 130° C. was −20%. The concentration of the aliphatic hydrocarbon gas in the resultant molded product of expanded beads was measured to be the detection limit (50 ppm by volume) or lower.

This molded product of expanded beads was composited with skin materials in the manner similar to Example 1.

The detailed conditions are listed in Table 1.

No fiber reinforced composite could be produced in Comparative Example 1 because the core material melted during the composite processing.

Comparative Example 2

Base material resin pellets as a core material were fabricated by heat melting, kneading, and then extruding 100% by mass of polypropylene resin (PP) in the extruder. A viscoelasticity measurement of this base material resin revealed that Tp was 153° C. and G'2/G'1 was 0.14.

A molded product of expanded beads was fabricated using the pellets in the manner similar to Example 1. The heat shrinkage onset temperature of the resultant molded product of expanded beads was measured to be 95° C. The linear expansion coefficient of the resultant molded product of expanded beads was measured to be $12 \times 10^{-5}$ mm/mm·° C. The ratio of change in dimensions of the resultant molded product of expanded beads at 130° C. was −0.5%. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

A fiber reinforced composite could be produced in Comparative Example 2 which was good in thickness and apparent density. However, as for the appearance, a number of resin insufficiencies and creases induced by the large linear expansion coefficient were observed. There were also a number of gaps between the skin material and the core materials also induced by the linear expansion coefficient, which was not acceptable for practical use.

Comparative Example 3

Mini pellets were fabricated by heat melting, kneading, and then extruding 100% by mass of a polymethyl methacrylate resin (PMMA) in the extruder. A viscoelasticity measurement of this base material resin revealed that Tp was 127° C. and G'2/G'1 was 0.01 or less.

A molded product of expanded beads was fabricated using the pellets in the manner similar to Example 1. The heat shrinkage onset temperature of the resultant molded product of expanded beads was measured to be 75° C. The linear expansion coefficient of the resultant molded product of expanded beads was measured to be $8 \times 10^{-5}$ mm/mm·° C. The ratio of change in dimensions of the resultant molded product of expanded beads at 130° C. was −15%. The concentration of the aliphatic hydrocarbon gas in the resultant molded product of expanded beads was measured to be the detection limit (50 ppm by volume) or lower.

This molded product of expanded beads was composited with skin materials in the manner similar to Example 1.

The detailed conditions are listed in Table 1.

No composite could be produced in Comparative Example 3 because the core material melted during the composite processing as in Comparative Example 1.

Comparative Example 4

Mini pellets were fabricated by heat melting, kneading, and then extruding 100% by mass of a polystyrene resin (styrene-methacrylic acid copolymer) (SMAA) in the extruder. A viscoelasticity measurement of this base material resin revealed that Tp was 145° C. and G'2/G'1 was 0.17.

A molded product of expanded beads was fabricated using the pellets in the manner similar to Example 1. The heat shrinkage onset temperature of the resultant molded product of expanded beads was measured to be 80° C. The linear expansion coefficient of the resultant molded product of expanded beads was measured to be $7 \times 10^{-5}$ mm/mm·° C. The ratio of change in dimensions of the resultant molded product of expanded beads at 130° C. was −5.0%. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

A fiber reinforced composite could be produced in Comparative Example 4, but the core materials shrank significantly and the fiber reinforced composite was not acceptable for practical use.

Comparative Example 5

Base material resin pellets as a core material were fabricated by heat melting, kneading, and then extruding 20% by mass of a polyphenylene ether resin (PPE) and 80% by mass of a polystyrene resin (PS) in the extruder. A viscoelasticity measurement of this base material resin revealed that Tp was 141° C. and G'2/G'1 was 0.04.

A molded product of expanded beads was fabricated using the pellets in the manner similar to Example 1. The heat shrinkage onset temperature of the resultant molded product of expanded beads was measured to be 75° C. The linear expansion coefficient of the resultant molded product of expanded beads was measured to be $6 \times 10^{-5}$ mm/mm·° C. The ratio of change in dimensions of the resultant molded product of expanded beads at 130° C. was −2.7%. The concentration of the aliphatic hydrocarbon gas in the resultant molded product of expanded beads was measured to be the detection limit (50 ppm by volume) or lower.

This molded product of expanded beads was composited with skin materials in the manner similar to Example 1, and the resultant fiber reinforced composite was evaluated.

The detailed conditions are listed in Table 1.

The fiber reinforced composite of Comparative Example 5 was thin and had a high apparent density because the molded article had shrunk. Creases were observed on its surface due to the low shrink initiation temperature, and the composite was not acceptable for practical use.

Comparative Example 6

A molded product of expanded beads was fabricated in the manner similar to Example 2 except that pentane was used as a foaming gas.

The heat shrinkage onset temperature of the resultant molded product of expanded beads was measured to be 90° C. The linear expansion coefficient of the resultant molded product of expanded beads was measured to be $5 \times 10^{-5}$ mm/mm·° C. The ratio of change in dimensions of the resultant molded product of expanded beads at 130° C. was +1.5%. The concentration of the aliphatic hydrocarbon gas in the resultant molded product of expanded beads was measured to be 1500 ppm by volume.

This molded product of expanded beads was composited with skin materials in the manner similar to Example 1, and the resultant fiber reinforced composite was evaluated.

The detailed conditions are listed in Table 1.

The fiber reinforced composite of Comparative Example 6 had an appearance at an acceptable level for use although the surface smoothness was poorer than the fiber reinforced composite of Example 2. However, there were a number of gaps between the skin materials and the core material caused by expansion of the molded product of expanded beads, which was not acceptable for practical use. The dimensional repeatability was also poor because of the difficulty of control on the expansion.

TABLE 1

| | | | | | Examples | | | | | | | |
| | | | | | 1 | 2 | 3 | 4 | 5 | 6 | 7 | 8 |
|---|---|---|---|---|---|---|---|---|---|---|---|---|
| Core material (bead foam molded body) | Thermoplastic resin | PPE | | % by mass | 73 | 40 | 40 | 40 | 50 | 60 | 35 | 30 |
| | | Other resins | PS | % by mass | 15 | 60 | 60 | 60 | 50 | 40 | 65 | 70 |
| | | | HIPS | % by mass | 12 | — | — | — | — | — | — | — |
| | | | PP | % by mass | — | — | — | — | — | — | — | — |
| | | | PMMA | % by mass | — | — | — | — | — | — | — | — |
| | | | SMAA | % by mass | — | — | — | — | — | — | — | — |
| | Additive | Flame retardant | | % by mass | 22 | — | — | — | — | — | — | — |
| | Physical property of resin | Viscoelasticity. | TP | ° C. | 153 | 158 | 158 | 158 | 165 | 173 | 154 | 150 |
| | | | G'2/G'1 | — | 0.40 | 0.81 | 0.81 | 0.81 | 0.87 | 0.93 | 0.45 | 0.28 |
| | Expanding agent | | | | — | inorganic gas | inorganic gas | inorganic gas | inorganic gas | inorganic gas | inorganic gas | inorganic gas |

TABLE 1-continued

|  |  |  |  |  |  |  |  |  |  |  |  |
|---|---|---|---|---|---|---|---|---|---|---|---|
|  | Properties of foamed body | Heat shrink initiation temperature | °C. | 85 | 95 | 95 | 95 | 105 | 115 | 85 | 80 |
|  |  | Linear expansion | mm/. mm · °C | 5C10-5 | 4C10-5 | 4C10-5 | 4C10-5 | 3C10-5 | 2C10-5 | 5C10-5 | 5C10-5 |
|  |  | Ratio of change in dimensions with heating at 130° C. | % | −3.6 | >−0.1%, <0% | >−0.1%, <0% | >−0.1%, <0% | >−0.1%, <0% | >−0.1%, <0% | >−0.1%, <0% | −0.3 |
|  |  | Residual gas concentration | ppm by volume | n.d. | n.d. | n.d. | n.d. | n.d. | n.d. | n.d. | n.d. |
|  |  | Expansion ratio of bead foam molded body | cm³/g | 10 | 10 | 5 | 15 | 10 | 10 | 10 | 10 |
| Skin material | Reinforcing fibers |  | — | carbon fiber | carbon fiber | carbon fiber | carbon fiber | carbon fiber | carbon fiber | carbon fiber | carbon fiber |
|  | Matrix resin |  | — | epoxy resin | epoxy resin | epoxy resin | epoxy resin | epoxy resin | epoxy resin | epoxy resin | epoxy resin |
|  | Property | Thickness | mm | 0.40 | 0.40 | 0.40 | 0.40 | 0.40 | 0.40 | 0.40 | 0.40 |
| Fiber reinforced composite | Properties of foamed body | Thickness | mm | 2.0 | 2.0 | 2.0 | 2.0 | 2.0 | 2.0 | 2.0 | 1.9 |
|  |  | Apparent density | g/cm³ | 0.40 | 0.40 | 0.40 | 0.40 | 0.40 | 0.40 | 0.40 | 0.42 |
|  |  | Surface smoothness/ appearance | — | A | A | A | A | A | A | A | B |
|  |  | Adhesion | — | B | A | A | A | A | A | A | A |
|  |  | Dimensional repeatability | — | B | A | A | A | A | A | A | A |

|  |  |  |  |  |  | Comparative Examples |  |  |  |  |  |
|---|---|---|---|---|---|---|---|---|---|---|---|
|  |  |  |  |  |  | 1* | 2 | 3 | 4 | 5 | 6 |
| Core material (bead foam molded body) | Thermoplastic resin | PPE |  | % by mass | — | — | — | — | 20 | 40 |
|  |  | Other resins | PS | % by mass | 100 | — | — | — | 80 | 60 |
|  |  |  | HIPS | % by mass | — | — | — | — | — | — |
|  |  |  | PP | % by mass | — | 100 | — | — | — | — |
|  |  |  | PMMA | % by mass | — | — | 100 | — | — | — |
|  |  |  | SMAA | % by mass | — | — | — | 100 | — | — |
|  | Additive | Flame retardant |  | % by mass | — | — | — | — | — | — |
|  | Physical property of resin | Viscoelasticity. | TP | °C. | 118 | 153 | 127 | 145 | 141 | 158 |
|  |  |  | G2'/G1' | — | <0.01 | 0.14 | <0.01 | 0.17 | 0.04 | 0.81 |
|  | Expanding agent |  |  | — | inorganic gas | inorganic gas | inorganic gas | inorganic gas | inorganic gas | pentane |
|  | Properties of foamed body | Heat shrink initiation temperature | °C. | 70 | 95 | 75 | 80 | 75 | 90 |
|  |  | Linear expansion |  | mm/ mm · °C. | 7C10-5 | 12C10-5 | 8C10-5 | 7C10-5 | 6C10-5 | 5C10-5 |
|  |  | Ratio of change in dimensions with heating at 130° C. |  | % | −20 | −0.5 | −15 | −5 | −2.7 | +1.5 |
|  |  | Residual gas concentration |  | ppm by volume | n.d. | n.d. | n.d. | n.d. | n.d. | 1500 |
|  |  | Expansion ratio of bead foam molded body |  | cm³/g | 10 | 10 | 10 | 10 | 10 | 10 |
| Skin material | Reinforcing fibers |  |  | — | carbon fiber | carbon fiber | carbon fiber | carbon fiber | carbon fiber | carbon fiber |
|  | Matrix resin |  |  | — | epoxy resin | epoxy resin | epoxy resin | epoxy resin | epoxy resin | epoxy resin |
|  | Property | Thickness |  | mm | 0.40 | 0.40 | 0.40 | 0.40 | 0.40 | 0.40 |
| Fiber reinforced composite | Properties of foamed body | Thickness |  | mm | — | 2.0 | — | 1.3 | 1.7 | 2.2 |
|  |  | Apparent density |  | g/cm³ | — | 0.40 | — | 0.62 | 0.45 | 0.39 |
|  |  | Surface smoothness/ appearance |  | — | — | C | — | C | C | B |
|  |  | Adhesion |  | — | — | C | — | C | A | C |
|  |  | Dimensional repeatability |  | — | — | B | — | C | A | C | n.d.: Undetected
*: No reinforced composite cound be fabrica ed

INDUSTRIAL APPLICABILITY

The core material for a fiber reinforced composite of the present disclosure has an excellent workability upon being composited with a fiber reinforcing material, and a fiber reinforced composite comprising the same can be suitably used particularly in the automotive industry (for parts such as roofs, hoods, and fenders of automobiles, for example).

The invention claimed is:

1. A core material for a fiber reinforced composite comprising:
    a molded product of expanded beads containing a thermoplastic resin, and having a heat shrinkage onset temperature of 80° C. or higher, a linear expansion coefficient of $10 \times 10^{-5}$ mm/mm·° C. or less, and a ratio of change in dimensions with heating at 130° C. of -3.0% to 0%.

2. The core material for a fiber reinforced composite of claim 1, wherein the thermoplastic resin has a ratio (G'2/G'1) of a storage modulus (G'1) at (Tp −30)° C. and a storage modulus (G'2) at 150° C. is 0.25 to 0.95, where Tp is a temperature where a loss tangent tanδ reaches a maximum value between 70° C. and 200° C.

3. The core material for a fiber reinforced composite of claim 1, wherein a concentration of an aliphatic hydrocarbon gas in the molded product of expanded beads is 500 ppm by volume or less.

4. The core material for a fiber reinforced composite of claim 1, wherein the thermoplastic resin contains 30% by mass to 75% by mass of a polyphenylene ether resin.

5. The core material for a fiber reinforced composite of claim 1, wherein a content of a flame retardant in the thermoplastic resin is 3% by mass or less relative to 100% by mass of the thermoplastic resin.

6. A fiber reinforced composite comprising:
    the core material for a fiber reinforced composite of claim 1; and
    a skin material comprising fibers and a resin, the skin material being disposed on at least a part of a surface of the core material.

* * * * *